US009311367B2

(12) United States Patent
Erickson et al.

(10) Patent No.: US 9,311,367 B2
(45) Date of Patent: Apr. 12, 2016

(54) DATABASE EXTENSION STRUCTURE

(75) Inventors: John S. Erickson, Norwich, VT (US); David Murray Banks, Bristol (GB); Mark Henry Butler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1686 days.

(21) Appl. No.: 11/096,577

(22) Filed: Mar. 30, 2005

(65) Prior Publication Data

US 2006/0230023 A1    Oct. 12, 2006

(51) Int. Cl.
*G06F 17/30* (2006.01)

(52) U.S. Cl.
CPC .............................. *G06F 17/30557* (2013.01)

(58) Field of Classification Search
None
See application file for complete search history.

(56) References Cited

U.S. PATENT DOCUMENTS

| | | | |
|---|---|---|---|
| 6,954,748 B2 * | 10/2005 | Dettinger et al. | 707/774 |
| 2002/0165988 A1 * | 11/2002 | Khan et al. | 709/246 |
| 2003/0120675 A1 * | 6/2003 | Stauber et al. | 707/100 |
| 2004/0117425 A1 * | 6/2004 | Berkland et al. | 709/200 |
| 2004/0193635 A1 * | 9/2004 | Hsu et al. | 707/102 |
| 2004/0205751 A1 * | 10/2004 | Berkowitz et al. | 718/1 |
| 2005/0193097 A1 * | 9/2005 | Guthrie et al. | 709/219 |
| 2006/0136351 A1 * | 6/2006 | Angrish et al. | 707/1 |

OTHER PUBLICATIONS

Kahn, R., et al., "A Framework for Distributed Digital Object Services," Internet: <http://www.cnri.reston.va.us/home/cstr/arch/k-w.html> pp. 1-12. (May 13, 2005).
*ICSTI Forum*, Internet: <http://www.icsti.org/forum/30> No. 30, pp. 1-41 (Apr. 1999).
Moats, R., "URN Syntax," *Network Working Group*, pp. 1-11 (May 1997).
Moats, R., "URN Syntax," *Network Working Group* Internet: <http://www.ietf.org/rfc/rfc2141.txt> pp. 1-8 (May 1997).
Parastadtidis, S., et al., "SSDL—The SOAP Service Description Language," Internet: <http://www.sadl.org/overview.html> pp. 1-4 (Feb. 15, 2005).
The Owl Services Coalition, "OWL-S. Semanctic Markup for Web Services," Internet: <http://www.daml.org/services/owl-s/1.0/ 25 pages. (Nov. 2003).
Salz, R., "Really Simple Web Service Descriptions," XML.com Internet: <http://webservices.xml.com/1pt/a/ws/2003/10/14/salz.html> pp. 1-4 (Oct. 14, 2003).

(Continued)

*Primary Examiner* — Jau-Shya Meng
(74) *Attorney, Agent, or Firm* — Hewlett-Packard Patent Department (57) ABSTRACT

A digital repository 20 includes data items. A user can add additional functionality or program routines to data item by including as a data item a data processing identifier pointing to at least one data processing routine. Such routines are accessed by a client 22 by sending from a client to the digital repository 20 a request to access a data item, wherein the repository provides an interface description document 32 from the digital repository 20 to the client 22 as the response to the request. The client 22 can then transmit a data processing request from the client to a service 26 identified by the data processing identifier of the interface description document 32, the data processing request including the identifier from the interface description document.

10 Claims, 4 Drawing Sheets

(56) References Cited

OTHER PUBLICATIONS

Shafer, K., et al., "Introduction to Persistent Uniform Resource Locator," *OCLC Online Computer Library Center, Inc.*, Internet: <http://purl.oclc.org/docs/inet96.html> pp. 1-8 (Retrieved on May 13, 2005).

"URN Namespace for Life Science Identifiers" Internet: <http://www.omg.org/docs/lsr/03-05-02.txt> pp. 1-4 (Sep. 20, 2002).

* cited by examiner

DATABASE EXTENSION STRUCTURE

FIELD OF INVENTION

The invention relates to a method, apparatus and computer program product for providing extensions to object behaviour in a database environment, particularly but not exclusively in a semistructured or triple oriented data store.

RELATED ART

Digital object repositories are databases. The term is generally applied to databases which are designed to hold a variety of different media objects, in arbitrary collections, combinations and hierarchies. They may thus be contrasted with conventional relational databases which store data in pre-defined tables.

Most digital object repositories, such as DSpace, ARKive and arXiv have fixed interfaces for accessing objects. These frameworks do not expose programmatic interfaces to objects in the collections, so they do not allow for additional functionality or arbitrary operations to be associated with objects or groups of objects.

A development of this approach is provided by Robert Kahn and Robert Wilensky, "A Framework for Distributed Digital Object Services," cnri.dlib/tn95-01, May, 1995. This paper sets out a framework that provides means for extending the interface of managed objects. "Fedora" is an implementation of this method.

Such models allow specialised behaviours to be associated with objects by the system administrators.

Conventional repositories do not allow extensions to the data model or the programmatic API that accesses the data model.

SUMMARY OF THE INVENTION

According to the invention, there is provided:
a method of accessing data stored in a digital repository containing data items, comprising:
sending from a client to the digital repository a request to access a data item, wherein the data item stored in the repository includes an identifier pointing to an interface routine;
running the interface routine pointed to by the identifier to obtain an interface description document including at least one identifier pointing to at least one data processing routine;
returning the interface description document from the repository to the client as the response to the request;
transmitting a data processing request from the client to an identifier of the interface description document;
accessing the data in the repository;
applying the requested data processing method to the accessed data to obtain processed data; and
returning to the client the processed data.

The method allows for processes to be attached to objects in the digital repository so that the methods can be invoked by simply requesting the data item, which returns a description document identifying how the method can be invoked.

The invention also relates to a digital repository and a computer program product.

BRIEF DESCRIPTION OF DRAWINGS

For a better understanding of the invention an embodiment will now be described, purely by way of example, with reference to the accompanying drawings, in which.

DETAILED DESCRIPTION

Figure 1:
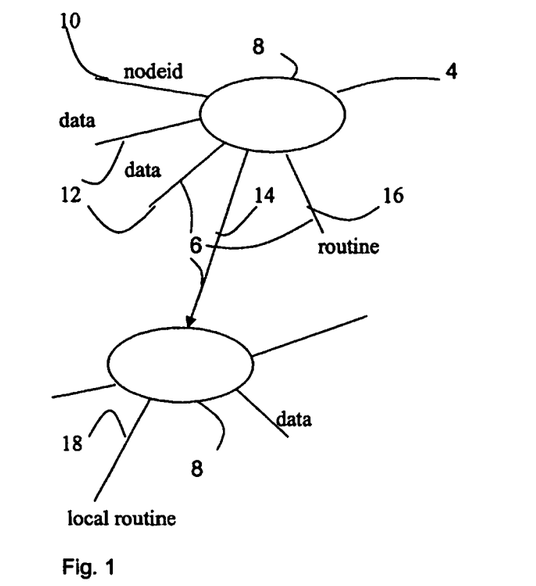
FIG. 1 illustrates the data structure of data stored in a repository according to the invention.

Referring to FIG. 1, a digital repository 20 according to the example includes data of database 2 stored as nodes 4, each node having properties 6 that may point to other nodes, to data, or to routines.

It will be seen that node 10 has one node id property 8 giving the node id as 10, a unique number representing the node, two data properties 12 storing data, two identifier properties 14 pointing to related nodes, and a routine property 16 pointing to "routine". This last data item is an identifier pointing to a web service used to create a web service API. In the present embodiment the web service is a Web Services Description Language (WSDL) routine used to create a web service API and having as a parameter value within the identifier at least one further identifier pointing to a data processing routine as will be described below.

Second node 11 is a child node labelled 11 which has an identifier to a local routine as property 18, as will be described in more detail below.

While graphs of the form of FIG. 1 conveniently show the tree structure of data, such data may also be represented in other ways more convenient for storing in a computer.

Thus, for the node 10 at the top left in FIG. 1, the data may be represented by a table of properties and values:

TABLE 1

| Property | Value |
|---|---|
| nodeid | 10 |
| collection | 100000 |
| collection | 100010 |
| child node | 11 |
| data | literal_data |
| data | identifier_to_data |
| thumbnail | thumbnail_identifier |

It will be noted that each property has a value. In some cases, the value is a literal, in others the value is an identifier to data, and in other cases the value is an address in the form of a Uniform Resource identifier, or other type of identifier, identifying the address of the resource, in some cases including parameter values.

In the specific embodiment shown, the identifier chosen is a conventional Universal Resource Locator URL and so for example the thumbnail value is a thumbnail_url. The node id is a unique identifier for the node, containing in this example the value 10.

Nodes are grouped into collections of nodes. Each node may be in one or more collections of nodes. In the embodiment, nodes are assigned to collections using a single collection property of the node. Table 1 shows that node 10 belongs to a collection containing as a value the numerical value 100010 which is an arbitrary label of the collection to which the node belongs. Alternatively, instead of storing the collection in the individual nodes the collection may be stored as a node including identifiers to each node of the collection.

One collection is a root collection to which all nodes belong. This information need not stored separately for each node. However, for simplicity, in the preferred embodiment the root collection is simply treated as a normal collection and each node has an identifier pointing to it. In table 1, the root collection is assigned the numerical value 100000 and the node 10 includes an identifier pointing to it, as do all nodes. Some nodes may belong only to the root collection.

The node 10 has two pieces of data associated directly with it, one being a piece of literal data and one being an identifier to a data resource elsewhere.

Table 1 shows the data only for one node. In order to represent the whole database, the database may be represented by data triples, in the form (node_id, property, value).

Figure 2:
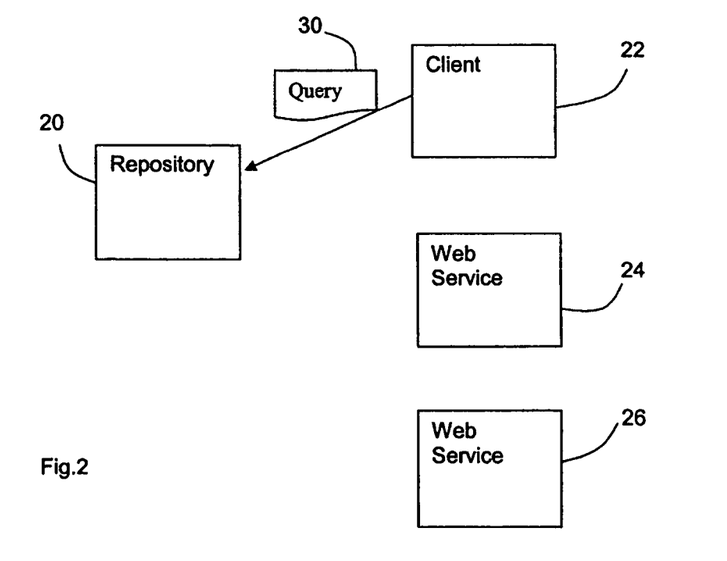
FIGS. 2 to 6 illustrate steps in a method according to a first embodiment.

Referring to FIG. 2, the digital repository 20, which includes database 2, is shown, together with client 22 and web services 24, 26. It will be appreciated that in general there will be many more clients, but only one is shown to simplify the drawing.

The digital repository 20, client 22 and web services 24, 26 are networked together; the networked links are not shown and any suitable networking approach may be used.

Firstly, let us consider how the embodiment allows a routine to be invoked that does not require arguments. An example is provided in property 18 which points to a URL of the routine to execute the routine, a segment of the identifier, here a query string as part of the URL, is an identifier to a local data item 12 on the same node 8.

To invoke the method, all that is required is for a client to request the data represented by property 18. Resolution of the URL of property 18 will cause the method to be executed.

For example, the local routine may be a routine to provide a thumbnail image of a larger image on the same node. If a client wishes to access the thumbnail image, it simply requests the thumbnail image by requesting the data attached to the respective identifier. The request causes the URL of the identifier to be retrieved, running a routine that takes the standard image as an input that returns the thumbnail. As far as the client 22 is concerned, this functionality is identical to the case where the thumbnail has already been prepared and stored in the repository. This thumbnail is accessed in exactly the same way as if the thumbnail was actually present in the digital repository.

As will be appreciated, this simple method is not applicable to the case when the client needs to provide a parameter, such as the size of the thumbnail, since the URL is in effect a method call that includes static arguments.

For this reason, additional functionality is provided to allow the client to also call routines requiring parameters, for example a parameter indicating the required size of the thumbnail, which can be varied rather than being predefined.

In order for the client to access enhanced functionality attached to node 10 the client 22 first sends a query 30 (FIG. 2) in the form of an access request to the digital repository 20 requesting to access the property 16 of a specific node 10 pointing to the parameter method. The digital repository 20 then returns a web service API description such as a WSDL document 32 including identifiers, in the example firstly a URL of the parameter method stored as web service 26, and secondly a URL pointing to the data 12 of this specific node 10 to allow the web service 26 to access the data of the specific node.

This may be done in a number of different ways. One approach is for the property 16 to be a URL of an interface routine getWebAPI (parameterMethod_url,Data_url). The interface routine getWebAPI prepares a web service description document such as a WSDL document detailing how to access the routine specified by the URLs passed as an argument to getWebAPI. The first argument, ParameterMethod_url contains the 15 URL of a data processing routine which may be invoked by the client. The second argument, Data_url, is a URL indicating the URL of the data to be processed.

The interface routine may take multiple pairs of parameters to allow multiple URLs to be passed.

Alternatively, calls to such data items including URLs may be intercepted in the digital repository 20 which can itself identify that the routine getWebAPI needs to be called. In this case, the property 16 may only need to contain an indication of the location of the routine to be accessed, ParameterMethod_url, and if applicable the data if there is more than one data item 12 attached to the node that might be the required data item to be processed.

In general, the web service API description 32 may include details of a number of different web services 24, 26 all of which may provide the method, identified by respective data processing URLs, and multiple data items all identified by respective data URLs.

Figure 3:
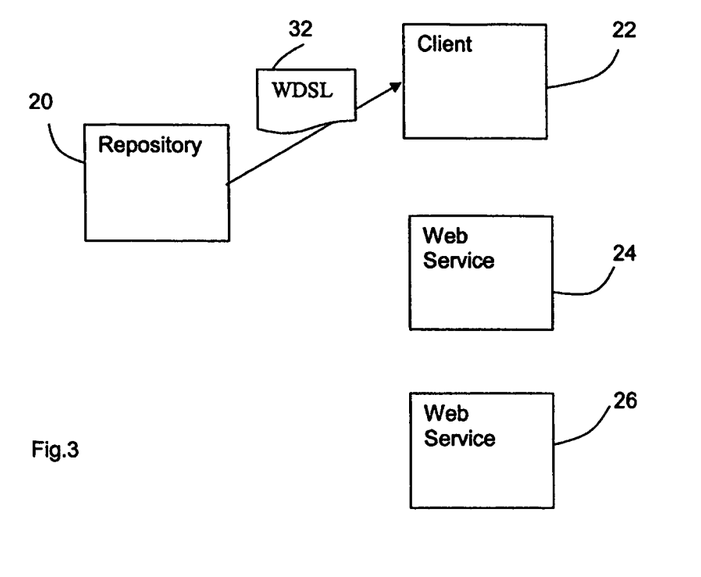

The web service description document 32 is transmitted (FIG. 3) back to the client.

Figure 4:
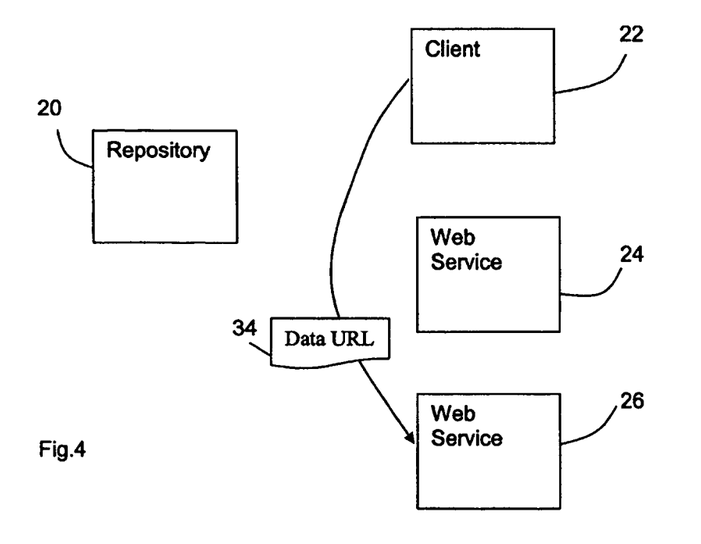

The client then selects one of the available web services specified in the web service description document 32, and calls the chosen web service 26 (FIG. 4). In the example, this web service 26 is stored on a separate machine, though it is also possible for the web service 26 to be on the digital repository 20 itself. The call 34 to the chosen web service 26 includes the data URL of the required data, taken from the web service description document.

Figure 5:
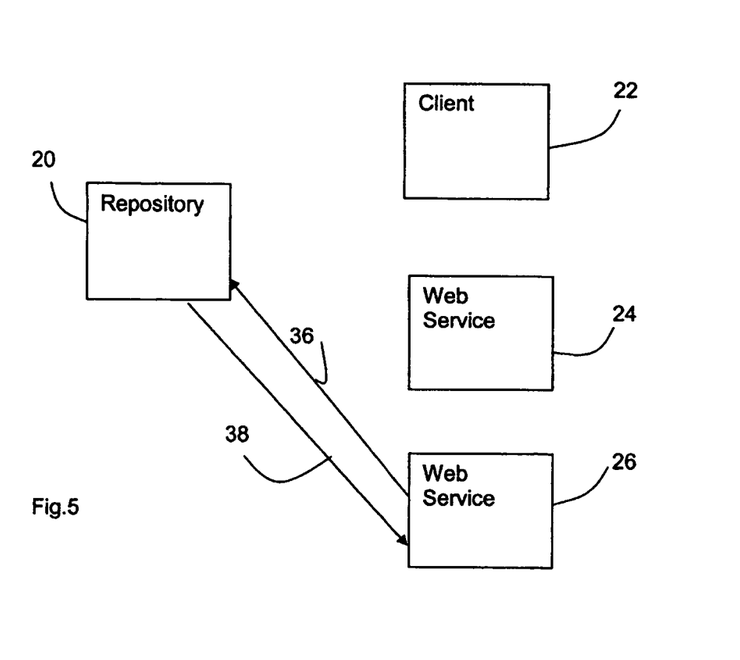
Figure 6:
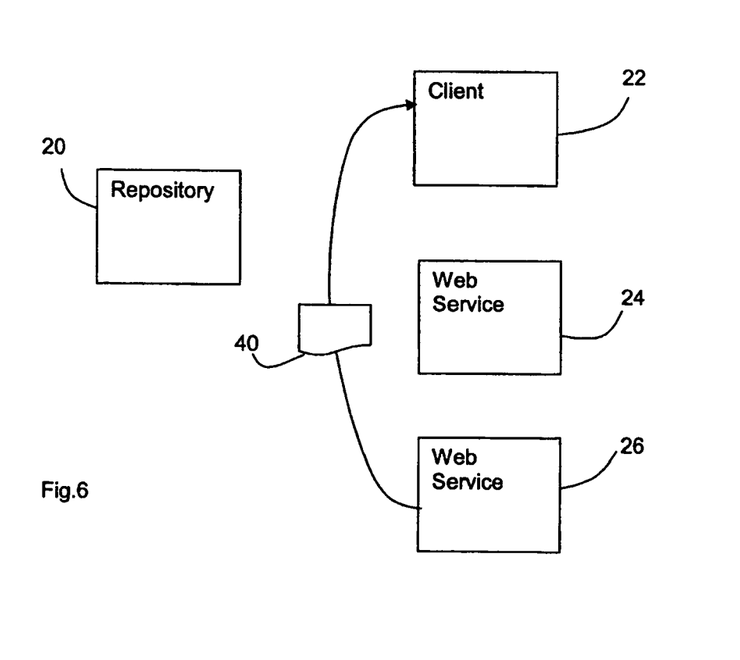

The web service 26 then uses the data URL of the data from the call 34 to obtain the data from the repository 20, as illustrated in FIG. 5 which shows the request 36 for the data and the returned data 38. The web service 26 then executes the selected method using the returned data 38 to obtain processed data and returns the processed data 40 to the client (FIG. 6).

This functionality described above allows the extension of data stored in a digital repository by processes requiring arguments, since the client 22 can provide arguments when calling the web service 26 using call 34.

For example, returning to the thumbnail idea again, a user can add a process for providing a thumbnail to a node by adding a data item 16 including a call to getWebAPI with two arguments. The first argument is the URL PrepareThumbnail_url of a routine for obtaining the thumbnail PrepareThumbnail and the second argument is the URL Image_url of the data of the image from which the thumbnail is prepared. Thus, the data item 16 added to the node 8 may be getWebAPI (PrepareThumbnail_url,Image_url).

When this data item is invoked, the routine getWebAPI returns a web service description document detailing how to call the routine PrepareThumbnail and including the URL Image_url of the relevant image data.

The client can then invoke PrepareThumbnail_url(Image_url, ThumbnailSize) to call the routine PrepareThumbnail which may be located at webservice 26. Routine PrepareThumbnail calls the data repository requesting the data of Image_url and receives the image data in return. PrepareThumbnail then prepares a thumbnail of size ThumbnailSize from the image data and returns the thumbnail.

It will be appreciated that much more complex routines can be invoked in the same way, simply by adding a suitable URL to the appropriate data item. Users can create services and make them available for specific nodes without needing to reprogram the repository.

Another example is an image library which might maintain a library of images of photographic stock. Later a network operator might want to offer access to this library of images for mobile devices. It has its own service for transcoding the images so that they are suitable for display on mobile devices. The exact transcoding operation depends on the mobile device making the request. In addition, the image library wants to restrict which images are made available in this way. So the network operator selects these subset of the images, puts them in a collection, then adds a method call to the collection that takes some parameters about the target mobile device as parameters, and produces transcoded images as an output.

Both the method of adding functionality including arguments and the in-line calls without arguments allow individual methods to be added to nodes on a node by node basis simply by adding a suitable data item to the node. Thus, methods can be added by users with the right to add properties to nodes—there is no need to extend the object's interface since this remains unchanged.

In prior approaches, as far as the inventors are aware, it is either impossible to associate processes and routines with data, or it is only possible with system administration privileges by programming specific specialist behaviours for specific objects. In contrast, the approach of this embodiment allows the additional process to be added through the usual interface used by users for updating the data stored in the digital repository 20.

This example presents a web service description document such as a Web Services Description Language (WSDL) document 32 to the client 22 providing the information to call the routines. However, the use of WSDL is far from an essential feature and any interface description format may be used. Some alternative formats include are SSDL, Really Simple Web Service Descriptions and OWL-S.

A repository may optionally support more than one web service description format at the same time, in which case multiple service descriptions may exist for the same node. It is also possible that in order to request a service description, a client may have to supply some information i.e. authenticate its identity. This may result in a client-specific filtering of the service description, i.e. the exact composition of the generated interface description depends upon the identity of the user and/or some characteristic or attribute of the client system.

Further, although the example uses URLs as identifiers and locators, the skilled person will be familiar with other identifiers and locators that may also be used. For example URLs are a specific type of a uniform resource identifier (URI) which have a specific resolution scheme for interpreting them as locators. Some other possibilities identifiers which have different resolution schemes include Handles, PURLs (Persistent URLs) and LSIDs (Life Science Identifiers). In addition, URLs themselves are a specific type of universal resource names (URNs) so any URN that has an associated naming scheme as a resolution scheme for resolving identifiers to locators is potentially usable here.

The embodiment differs from FEDORA in a number of ways, including: i) the APIs can be customised to individual objects, not just object types, and in that ii) any user of the repository, not just the repository owner, can customise the APIs. This means that users can create functional overlays on networked data in a way that was not possible before, based upon a native, networked interface that is accessible to potentially all users.

Figure 7:
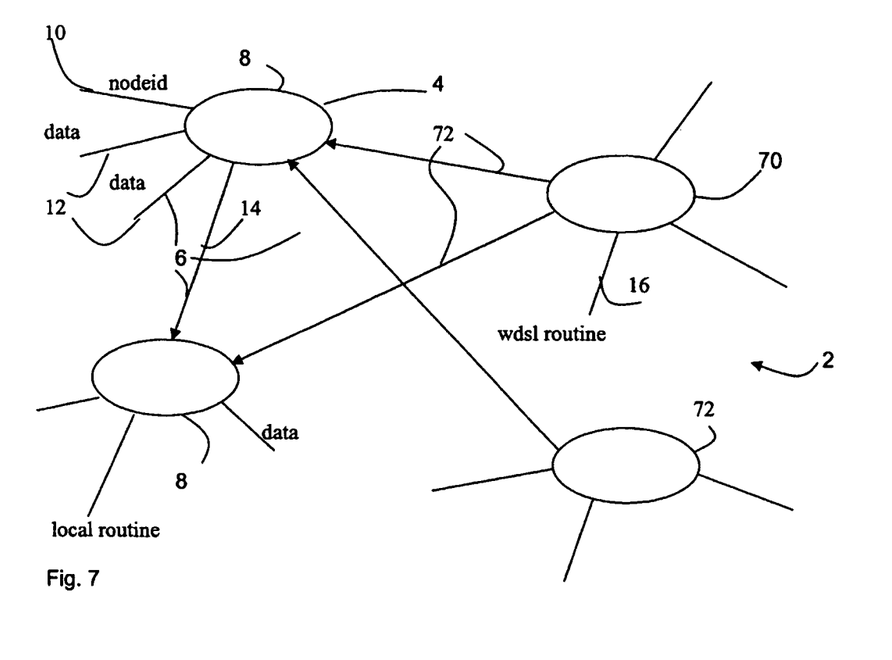
FIG. 7 illustrates a second embodiment of the invention.

In a second embodiment, illustrated in FIG. 7, instead of the methods being added on a node by node basis, collections of nodes are used to reduce the work in adding methods to a number of nodes.

Collection nodes 70, 72 include identifiers 74 to nodes; each node pointed to by a collection being part of the collection represented by that node. Thus, in the example of FIG. 7, both data nodes 8 are part of the first collection 70, but only one of the data nodes is part of the second collection 72. The nodes 8 already described above with reference to FIG. 1 are still present; they will be referred to as data nodes 8 to distinguish them from collection nodes 70,72.

Instead of attaching identifiers 16, 17 to static web service API descriptions to individual nodes, as in the first embodiment, the identifiers are attached to collection nodes 70, 72. In this way, a number of nodes may use the same routine simply by adding the node to the collection. Further, each collection may include a number of different routines simply by adding appropriate identifiers to the collection nodes 70,72 to deliver a variety of different web service API descriptions.

Alternatively, a single web service API description document returned by a routine 16 pointed to from a collection node may list a number of different data processing routines for execution by web services; the web service API description document may therefore in this case effectively define an interface comprising many different routines.

Note that data nodes are added to a collection using an identifier from the collection node to the data node, and not the other way round. This is so that when an object node is first received the methods that take arguments are not visible. Instead, there is a method available on the node called node.getInterface. When this is called, the digital repository 20 identifies all collections that a data node belongs to and hence all methods applicable to the data node 8. A single interface description document 32 is then created describing these methods and how to invoke them.

Since the method node.getInterface is defined for all nodes it need not be included in the definition of each node. If no interface documents are available for a node, a null or error message is returned by the routine.

A further benefit of having the identifiers point from the collection nodes 70,72 to the data nodes 8 is that data node 8 does not then include any properties related to the interface, avoiding any duplication between the interface description document 32 and the data of the data node.

Note that it is possible to include both identifiers 16 to routines on collection nodes 70,72, as in the second embodiment and on data nodes 8 as in the first embodiment to allow methods to be attached to individual nodes, if required, as well as to groups of nodes in cases where that is more convenient.

Those skilled in the art will realise that the above embodiments are purely by way of example and other approaches and details may be used.

For example, although the embodiments above use digital repositories in which the data is stored in nodes, the invention does not require the digital repository to use this model and alternative data storage arrangements may be used.

The invention claimed is:

1. A method of accessing data stored in a digital repository containing data items, comprising:
sending from a client to the digital repository an access request to access a data item, wherein the data item includes an interface identifier pointing to an interface routine;
obtaining, through running of the interface routine, an interface description document including a data processing resource identifier pointing to the at least one data processing routine, and at least one data identifier pointing to the data item stored in the digital repository;
returning the interface description document from the digital repository to the client as a response to the access request, wherein the data processing routine identifies a web service to which the client is to transmit a data processing request;

transmitting a data processing request from the client to the web service identified by the data processing routine, the data processing request including the at least one data identifier from the interface description document;

accessing, by the web service, the data item in the digital repository using the at least one data identifier;

processing, by the web service, the accessed data item to obtain processed data; and returning to the client the processed data from the web service.

2. The method according to claim 1, wherein accessing, by the web service, the data item further comprises:

calling the digital repository from the web service with the at least one data identifier; and returning the data item identified by the at least one data identifier from the digital repository to the web service as returned data; and wherein processing the accessed data item further comprises processing the returned data in the web service.

3. The method according to claim 1 wherein the digital repository includes a plurality of nodes, each node having at least one property, each property having a data/item/routine identifier pointing to data, a data item, or a data processing routine.

4. The method according to claim 3, wherein at least one node of the plurality of nodes has a property including the data and a further property of a direct resource identifier pointing to a direct processing routine that is to directly process a result, and wherein processing the accessed data item includes running the direct processing routine pointed to by the direct resource identifier to process the data pointed to by the data/item/routine identifier.

5. The method according to claim 3, wherein:

the digital repository includes at least one collection node, each of the at least one collection node includes a node identifier to at least one data node and a routine identifier to at least one data processing routine, and wherein obtaining an interface description document includes returning as the data processing resource identifier, the routine identifiers of the collection nodes and the node identifier to the data node to which the data item relates.

6. The method according to claim 1 wherein the interface description document is a Web Services Description Language document.

7. The method according to claim 1 wherein the digital repository includes a plurality of collections, a plurality of routines being associated with the plurality of collections; and wherein obtaining an interface description document further comprises:

identifying to which collection of the plurality of collections the requested data item belongs;

returning as the interface description document, an interface description document listing each routine associated with each collection to which the requested data item belongs that is capable of processing the requested data item.

8. A method of processing in a digital repository containing data items, comprising:

receiving from a client, a first request to access a data item, wherein the data item is stored in the digital repository and includes an interface identifier pointing to an interface routine;

running the interface routine pointed to by the interface identifier to obtain an interface description document including at least one data processing resource identifier pointing to at least one data processing routine and a data identifier identifying data in the digital repository;

returning the interface description document from the digital repository to the client as a response to the first request, wherein the at least one data processing routine identifies a web service to which the client is to transmit a data processing request;

receiving a second request from the web service identified by the at least one data processing routine to access the data identified by the data identifier; and returning the data item identified in the first request in the digital repository to the web service, wherein the web service is to implement the at least one data processing routine to process the data, and wherein the web service is to return the processed data to the client.

9. A non-transitory computer readable storage medium on which is stored machine readable instructions that when executed by a processor cause the processor to:

receive, from a client, a first request to access a data item from a plurality of data items stored in a digital repository, wherein the data item includes an interface identifier pointing to an interface routine;

run the interface routine pointed to by the interface identifier to obtain an interface description document including at least one routine identifier pointing to at least one data processing routine and a data identifier identifying data in the digital repository;

return the interface description document from the digital repository to the client as a response to the first request, wherein the at least one processing routine identifies a web service to which the client is to transmit a data processing request;

receive a second request from the web service identified by the at least one data processing routine to access the data identified by the data identifier; and return the data item identified in the first request in the digital repository to the web service, wherein the web service is to implement the at least one data processing routine to process the data, and wherein the web service is to return the processed data to the client.

10. A computerized digital repository system comprising:

a data store storing a plurality of nodes, each node of the plurality of nodes including at least one property, wherein the at least one property is a uniform resource indicator (identifier);

a plurality of data nodes, each data node of the plurality of data nodes containing at least one data identifier being or pointing to data; and at least one collection node, the at least one collection node having a property pointing to a data node containing an interface identifier pointing at a method of getting an interface description document;

wherein implementation of the at least one property of the data node including the interface identifier pointing at an interface routine that is to get an interface description document returns an interface description document to a client that requested access to a data item stored in the data store, wherein the interface description document describes at least one data processing routine to be applied to the data of the data node and how the at least one data processing routine is to be invoked by a web service; and a processor and a memory on which is stored machine readable instructions that when executed by the processor cause the processor to:
- return the interface description document from the digital repository to the client as a response to the request, wherein the interface description document includes at least one routine identifier pointing to the at least one data processing routine and a data identifier identifying data in the digital repository, and wherein the at least one data processing routine identifies a web service to which the client is to transmit a data processing request;
- receive a second request from the web service identified by the at least one data processing routine to access the data identified by the data identifier; and
- return the data item identified in the first request in the digital repository to the web service, wherein the web service is to implement the at least one data processing routine to process the data, and wherein the web service is to return the processed data to the client.

* * * * *